(No Model.)
B. W. SUTHERLEN.
DRAFT EQUALIZER.
No. 301,773. Patented July 8, 1884.
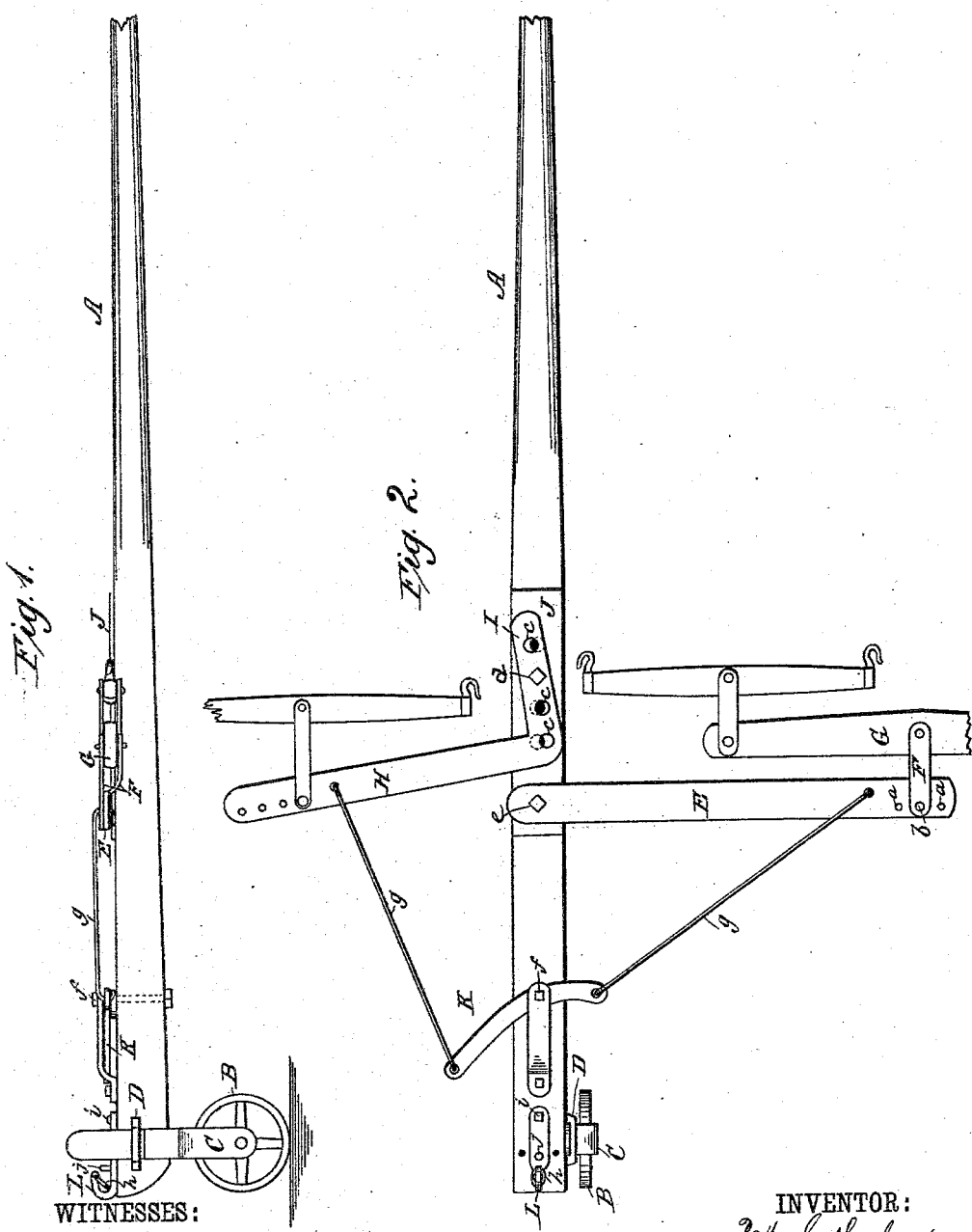
WITNESSES:
W. W. Hollingsworth
W. X. Stevens.
INVENTOR:
B. W. Sutherlen
BY Munn & Co
ATTORNEYS.

UNITED STATES PATENT OFFICE.

BENJAMIN W. SUTHERLEN, OF FILLMORE, MINNESOTA.

DRAFT-EQUALIZER.

SPECIFICATION forming part of Letters Patent No. 301,773, dated July 8, 1884.

Application filed March 21, 1884. (No model.)

*To all whom it may concern:*

Be it known that I, BENJAMIN W. SUTHERLEN, a citizen of the United States, residing at Fillmore, in the county of Fillmore and State of Minnesota, have invented certain new and useful Improvements in Draft-Equalizers, of which the following is a description.

This invention relates to that class of draft-equalizers which are used to assist one horse to draw against two. It is common in devices for this purpose to attach the single horse by means of a single-tree to the long arm of the draw-bar, and to attach the span of horses by means of a double-tree to the short arm of the same draw-bar. By this arrangement the single horse travels far away from the pole, requiring a broad path for the team to travel on, and making it awkward to turn corners, the turn being usually made upon the single horse. Side draft is also a serious obstacle to the proper working of a three-horse team with some equalizers.

The object of my invention is to perfectly equalize the draft upon a three-horse team, to allow the horses to travel close up to both sides of the pole, to prevent side draft, to support the evener from the ground, and to carry the forward end of some kinds of loads.

To this end my invention consists in the construction and combination of parts forming a draft-equalizer, hereinafter described and claimed, reference being had to the accompanying drawings, in which—

Figure 1 is a side elevation, and Fig. 2 is a plan view, of my invention.

A represents a team-pole, which may be made as an article of manufacture, in connection with my equalizing device, or it may be supplied by the farmer.

B is a supporting-wheel journaled in a fork, C, having a shank, which is secured to the side of the pole by means of a staple-bolt, D, passing through the pole and clasping said shank to it. By this means the pole may be set high or low from the ground upon the shank, or the pole may be inverted and the shank stuck through the other way, to make the equalizer right or left.

E is the span draft-bar, provided with a series of holes, *a*, into any one of which the bolt *b* may be placed to secure the clip F, which is the means of attaching the double-tree G.

H is the single-horse draft-bar, bent at a right angle, forming a forward arm, I. This arm is perforated with a number of holes, *c*, which coincide with holes in the plate J, so that the pivot-bolt *d* may be placed in any pair of holes to lengthen or shorten the leverage of the single horse. The span-bar E is pivoted at *e* to the same plate, J. This plate is removably secured to the pole by means of screw-bolts, so that it may readily be placed on the pole of any farm implement.

K is my evener, consisting of a curved bar of iron pivoted at *f* one-third its length from one end to the pole. *g g* are links or rods connecting the short end of the evener with the span-bar E and the long end with the single-horse bar H. By this means I give the single horse the necessary leverage to balance the span of horses, and yet I keep the single horse close to the pole. This is a great advantage on reapers, where the pole is required to be drawn as near to the standing grain as possible.

L represents the hook, to which a plow or anything else which is to be drawn is hitched. This hook is provided with a safety-latch, *h*, consisting of a link loosely hung to the point of the hook, to swing backward and upward within the hook, to allow a clevis or draft-chain to enter the hook. This latch is too long to swing forward out of the hook, thereby acting as a detent for anything inserted in the hook behind it. The hook L is pivoted to the tongue at *i*, to swing across it, and to be fixed at any desired point by means of a pin, *j*, entering any one of the arc of holes *k*, in order to assist in overcoming side draft, especially in drawing plows. Such plows have a tendency to run away from the landside, others run to it, some pitch too deeply into the ground, others rise out.

By means of my sidewise-adjustable hook on a tongue having its own supporting-wheel I can so direct the beam of the plow as to make it crowd away from or up to the land-side; and by means of the said wheel being vertically adjustable on an independent tongue I am able to give any desired pitch to the plow. This evener and pole, with a single vertically-adjustable wheel, may be used for hauling stone-drags, logs, &c., which require the forward end to be partly supported from the ground.

By using the pole with my evener a great assistance may be rendered by the team in backing a plow when the same gets hung under a stone or root.

What I claim as my invention, and wish to secure by Letters Patent, is—

1. In a draft-equalizer, the combination, with the elbow-lever H, having one or more perforations near the end of its outer arm, and a series of perforations, c, in its inner arm, of a plate, J, perforated correspondingly to the perforations c, and a pivot-bolt, d, as shown and described.

2. The combination, with the single-horse draft-bar H, pivoted near one end to the pole, and the two-horse draft-bar E, pivoted at one end to the pole, of the equalizing-lever K, pivoted to the pole at a distance from the said draft-bars, and the rods g, connecting the long arm of the lever K with the single-horse draft-bar, and connecting the short arm of lever K with the two-horse draft-bar, substantially as shown and described.

3. The combination, in a draft-equalizer, of the pole A, the single-horse draft-bar H, pivoted near one end thereto, the two-horse draft-bar E, pivoted at one end to the pole, the equalizer K, and the connections g, with the wheel B invertibly secured to the pole A, substantially as shown and described.

4. The combination, with the pole A, having a series of holes for the pin j, the draft-bars H and E, and the equalizer-lever K, pivoted thereto, and the connections g, of the wheel B, mounted on one side of the pole, the hook L, pivoted to the pole at i, and the adjusting-pin j, as shown and described.

BENJAMIN W. SUTHERLEN.

Witnesses:
C. H. ROBBINS,
MARCUS ROBBINS.